United States Patent [19]

Nordstrom et al.

[11] Patent Number: 4,653,890
[45] Date of Patent: Mar. 31, 1987

[54] FILM DEVELOPING SYSTEM FOR MICROIMAGE RECORDING APPARATUS

[75] Inventors: Eric W. Nordstrom, Forest Park; Paul G. Bielik, North Riverside; Michael E. Carlson, Des Plaines, all of Ill.

[73] Assignee: Bell & Howell Company, Chicago, Ill.

[21] Appl. No.: 787,898

[22] Filed: Oct. 16, 1985

[51] Int. Cl.⁴ .............. G03B 17/50; G03B 27/32; H05B 1/00
[52] U.S. Cl. .............................. 354/299; 355/27; 219/216
[58] Field of Search ............ 354/299; 355/27, 100, 355/106; 219/216, 388

[56] References Cited

U.S. PATENT DOCUMENTS

| | | | |
|---|---|---|---|
| 3,177,793 | 4/1965 | Stewart | 354/299 |
| 3,318,219 | 5/1967 | Anderson | 355/100 |
| 3,349,222 | 10/1967 | Johnston | 219/388 |
| 3,478,665 | 11/1969 | Umahashi et al. | 219/388 |
| 3,902,041 | 8/1975 | May | 219/216 |
| 4,123,157 | 10/1978 | Klose et al. | 355/43 |
| 4,275,959 | 6/1981 | Jones | 219/216 |
| 4,278,338 | 7/1981 | Baker et al. | 219/216 |
| 4,332,466 | 6/1982 | Flasck | 355/27 |
| 4,382,675 | 5/1983 | Marshall | 355/43 |
| 4,501,487 | 2/1985 | McCormick-Goodhart | 355/27 |

Primary Examiner—A. A. Mathews
Attorney, Agent, or Firm—Neal C. Johnson; Philip C. Peterson; Stanley J. Tomsa

[57] ABSTRACT

A film developing system for microimage recording apparatus providing computer output on microfilm utilizing an elongated film strip movable along a film path and employing heat for developing latent image areas formed on the film at an exposure station includes a support for positioning said film strip along the film path at spaced apart locations on opposite sides of a previously exposed latent image area in position ready for developing. A tensioning system is provided for exerting tension on the film strip between said support locations and a developer shoe having an outwardly convex, heated, film contacting surface is adapted to contact the facing surface of the film strip between the supports for developing the latent image area thereon. The developer shoe is mounted for movement between a remote position away from the film path and a film developing position wherein the film strip is tensioned to closer conform to the heated convex surface in intimate contact for a selected time period to develop the latent image area on the film. A heat shield automatically moves between a heat shielding position interposed between the heated surface of the developer shoe and the film strip and a retracted position when the developer shoe is moved into heated contact with the film for developing the image area thereon.

31 Claims, 5 Drawing Figures

FILM DEVELOPING SYSTEM FOR MICROIMAGE RECORDING APPARATUS

BACKGROUND OF THE INVENTION

1. Field of the Invention

The present invention relates to micrographics generally and more particularly to improvements in systems and methods for microimage recorders such as COM (Computer Output on Microfilm) recorders. The use of microimage records such as microfilm rolls or microfiche cards to retain, distribute and display enormous amounts of information and data generated by computers and other sources has increased dramatically during the year.

2. Description of the Prior Art

U.S. Pat. Nos. 4,123,157; 4,332,466; 4,382,675 and 4,501,487 disclose microimage recorders wherein images are exposed onto film and then transferred onto microfiche cards or roll film. In the apparatus disclosed in the foregoing patents, images developed by a cathode ray tube are exposed onto a master film subsequently developed and used for various purposes.

OBJECTS OF THE INVENTION

It is an object of the present invention to provide a new and improved film developing system for microimage recording apparatus and more particularly a new and improved developing system for microimage recorders such as COM (Computer Output on Microfilm) recorders.

It is an object of the present invention to provide a new and improved developing system for developing latent image areas previously exposed on the film by the application of heat to the film.

It is another object of the present invention to provide a new and improved developing system for a microimage recording apparatus of the character described especially adapted to utilize film having a relatively high film speed, such as a dry silver type film developed by heat.

The film developing system of the present invention is especially designed and adapted for use with a self-contained COM microimage recorder of the type disclosed in copending U.S. patent application Ser. No. 787,812, filed Oct. 15, 1985, and hereby incorporated herein by reference.

SUMMARY OF THE INVENTION

The foregoing and other objects and advantages of the present invention are accomplished in an illustrated embodiment comprising a new and improved film developing system for microimage recording apparatus of the type using an elongated film strip movable along a film path and utilizing heat for the development of latent image areas previously exposed on the film strip at an exposure station. The film developing system includes a support structure for positioning the film strip along a master film path at spaced apart support intervals on opposite sides of a previously exposed latent image area aligned in a position ready for heat development of the image. A tension system is provided for tensioning the film strip between the supports and a developer shoe having an outwardly convex, heated, film engaging surface is adapted to contact an exposed facing surface of the film strip between the supports to develop the latent image area. The developer shoe is mounted for movement between a remote position spaced away from the film path and a film developing position wherein the film strip is tensioned and deflected into intimate, closely conforming contact against the convex, heated surface of the developer shoe for a selected time period to develop the latent image area thereon. The heat shield is movable automatically between a heat shielding position interposed between the heated surface of the developer shoe and the film strip and a retracted position when the developer shoe is moved into contact with the film strip between the support locations to develop the image area on the film.

BRIEF DESCRIPTION OF THE DRAWINGS

The foregoing and other objects and advantages of the present invention may best be understood from consideration of the following detailed description taken in conjunction with the accompanying drawings, in which.

DESCRIPTION OF A PREFERRED EMBODIMENT OF THE INVENTION

Figure 1:
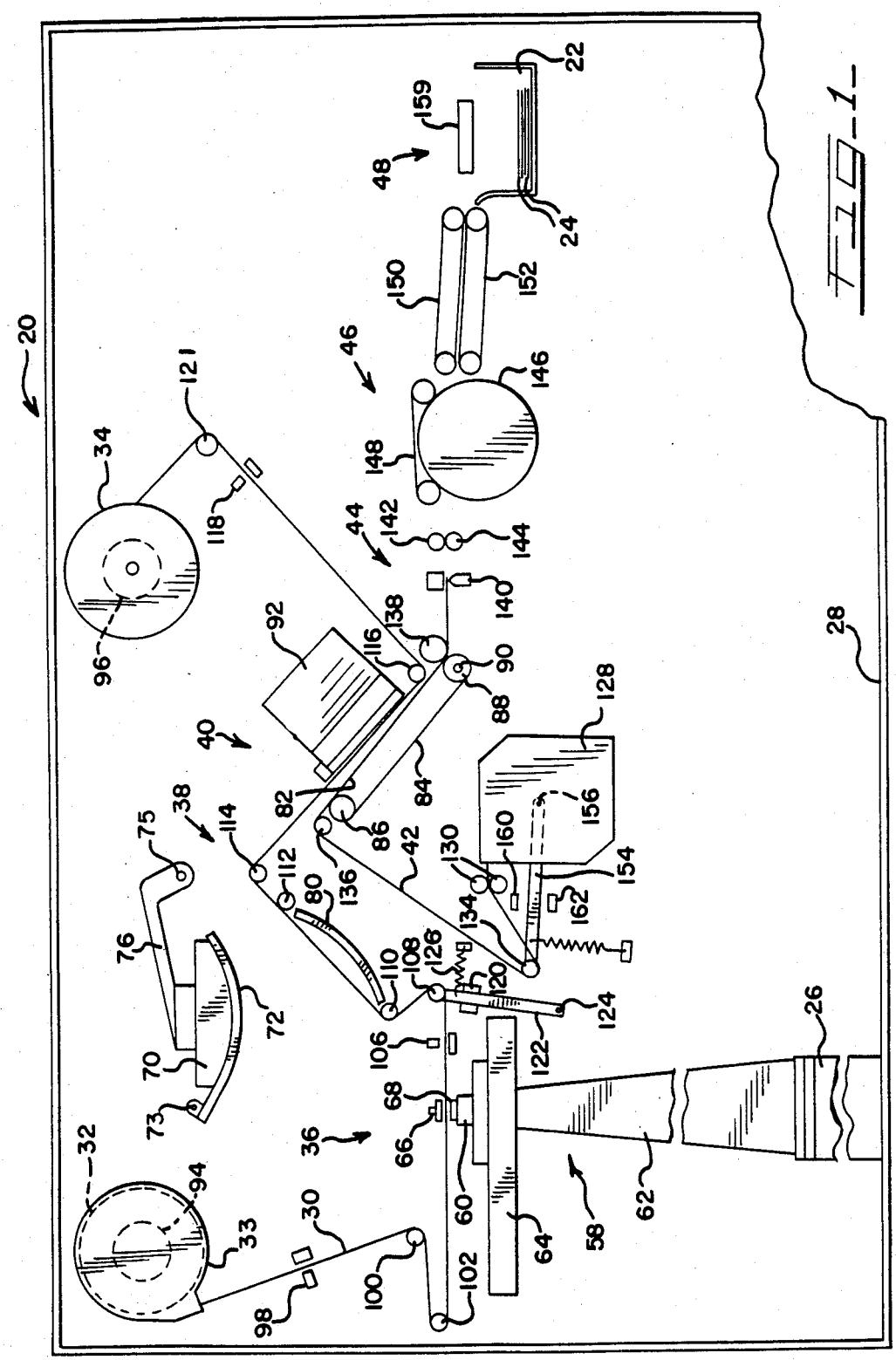
FIG. 1 is a schematic and diagrammatic front elevational view of a complete mircoimage recording apparatus including a film developing system for the heat development of latent images formed previously on a master film strip at an exposure station of the apparatus.

Referring now more particularly to the drawings and initially to FIG. 1, therein is illustrated in schematic and diagrammatic form a self-contained microimage recorder adapted to provide completed microfiche records of computer generated images. The self-contained COM (Computer Output on Microfilm) microimage recorder is of the type disclosed in copending U.S. patent application Ser. No. 787,812, filed Oct. 15, 1985, and incorporated herein by reference.

The microimage recorder is generally referred to as a whole by the reference numeral 20 and comprises an integral, self-contained apparatus adapted to provide at a recorder output port 22, a series of completed, discrete, microfiche records or cards 24, each of which bears an image pattern corresponding to a sequence of computer generated images which are furnished by a cathode ray tube or CRT 26. The microimage recorder 20 is housed in a self-supporting enclosure or housing 28 having a vertically upstanding base plate or chassis 29 spaced intermediately between front and rear walls of the housing and the chassis provide support for the multiple system components of the microimage recorder apparatus that are mounted thereon.

An elongated strip 30 of master film travels along a master film processing path which extends between a supply spool 32 and a takeup spool 34. The supply spool is powered by a drive motor 94 mounted on the rearward side of the chassis 29 and the takeup spool is similarly powered by a drive motor 96 mounted on the rearward face of the chassis. The drive motors 94 and 96 serve to advance and transport the master film strip along the master film path of the microimage recorder 20 and normally exert a desired amount of film tension on the film strip of approximately 5 lbs. The supply spool 32 for the master film strip is contained within a light sealed cassette 33 preferably of the type disclosed in copending U.S. patent application Ser. No. 787,836, filed Oct. 15, 1985, and incorporated herein by reference.

The master film travels along the master film processing path through an exposure station 36, a master film developing station 38 constructed in accordance with the features of the present invention and a duplication station generally designated as 40. A supply of duplicate film 42 is provided from a spool in a supply cartridge 128 and an elongated duplicate film strip moves along a duplicate film processing path through the duplication station 40 wherein the master film strip and the duplicate film strip processing paths converge, and through a cutting station generally designated as 44. The duplicate film then moves through a developing station generally designated as 46 and a clearing station generally designated as 48 at the outlet port 22.

The master film strip 30 and the duplicate film strip 42 move linearly along their respective continuous paths and an X-Y pattern or array of CRT generated images are provided in an image area on the completed microfiche records 24 without any necessity for complex relative movement of film carriages and the like. The duplicate film strip 42 is consumed within the self-contained microimage recorder 20 by cutting of the individual microfiche records from the end of the duplicate film strip. Preferably, the master film strip 30 comprises a dry silver, COM type film approximately 105 mm wide such as 8500 film offered by the 3M Corporation. This film is highly sensitive to light and has a relatively high film speed. After the master film strip 30 is processed within the microimage recorder as described, the completed film strip includes a sequence of linear arrays contained in image areas which are separated by guard bands providing margins having indexing blips thereon for assisting in the control of the travel of the master film strip along the processing path. Each image area may include an array of discrete images or frames which are set forth in patterns of rows and columns and in a typical format, a large number of images or frames are included in each image area. Machine or human readable indicia may be provided to identify each of the image areas.

A pattern or array of images is exposed onto an image area of the master film strip at the exposure station 36, wherein an optics assembly generally designated as 58 includes a lens 60 for focusing light images developed by the CRT 26 onto the master film. A movable light shroud or enclosure 62 confines the light from the CRT to a desired region or position on the film and an X-Y positioner 64 moves the lens to numerous different positions in rows and columns to form the array of exposed images in each image area on the film. During the exposure of each discrete image or frame, an aperture clamp 66 closes against a lens aperture block 68 to precisely position the master film in the proper plane for exposure.

The master film 30 moves along the film processing path from the supply cartridge 33 past a first film clamp 98 around an idler roller 100 to an encoder roller 102, as more fully described in the copending U.S. patent application Ser. No. 787,812, previously referred to herein and incorporated by reference. After the film is exposed to images provided by the optics assembly 58, the film passes by a second film clamp 106 and around a movable dancer roller 108 mounted on the outer end of a dancer arm 122 which may be maintained in a fixed position by a dancer arm clamp 120. When the dancer arm clamp is released, the dancer arm can rotate about a pivot axle 124 as urged by a bias spring 126 in order to provide an increased amount of tension on the master film strip 30 higher than the level of film tension of approximately 5 pounds normally provided by the drive motors 94 and 96.

The master film 30 travels upwardly from the dancer roller 108 toward the developing station 38 and at the station, the film is trained between a pair of spaced apart, support rollers 110 and 112. The rollers are spaced apart to provide support for the master film 30 on opposite ends of a previously exposed latent image area thereon to be developed by the application of heat as will be further described. The master film travels from the roller 112 around a roller 114 and then downwardly toward the duplication station 40. Leaving the station 40, the film passes over an exit roller 116 and upwardly past a third film clamp 118. Beyond the clamp 118, the master film passes a roller 121 and is eventually wound upon the takeup spool 34 driven by the takeup motor 96.

The duplicate film 42 passes from the duplicate film supply cartridge 128 around a dancer roller 134 mounted on the outer end of a dancer arm 154 urged by its weight in a counter-clockwise direction as indicated in FIG. 1. A pair of switches 160 and 162 are provided adjacent the dancer arm to detect alternate extreme positions of the arm and dancer roller. If tension on the duplicate film strip is lost because of breakage of the film strip, the the arm moves toward the switch 162 to initiate a signal. The switch 160 controls a pair of duplicate film strip drive rollers 130 which feed additional duplicate film strip 42 along the duplicate film strip processing path upon demand. The duplicate film strip 42 moves upwardly from the dancer roller 134 and around a roller 136 to the duplication station 40 wherein the master film processing path and the duplicate film processing path converge for duplication of the images from the master film strip onto the duplicate film strip. The duplication station 40 is more fully described and claimed in copending U.S. patent application Ser. No. 788,283, filed Oct. 17, 1985, and incorporated herein by reference. During the duplication process, the film strips 30 and 42 are clamped tightly together against a glass platen of a light housing 92 by a vacuum clamp 82 comprising an endless perforated belt 84 trained around rollers 86 and 88. The vacuum clamp is pivotal about an axis 90 of the roller 88 between clamping and released positions and the duplicated film 42 is held tightly against the vacuum belt 84 for movement in both forward and reverse directions.

After a segment of the duplicate film strip is imaged at the duplication station 40, the duplicate film strip passes outwardly beyond the roller 116 and a roller 138 into the cutting station 44 wherein a cutting knife 140 is activated to sever the duplicate film strip into discrete record segments 24 which are then fed by a pair of feed rollers 142 and 144 to the duplicate film developing station 46. At the developing station 46 the latent images on each individual microfiche or record 24 is developed by heat from a rotating heated drum 146. The records are pressed against the surface of the drum by a roller mounted, pressure belt 148. The developed records 24 leave the developing station 46 and are transferred by roller mounted feed belts 150 and 152 to the machine exit port 22. Preferably, the duplicate film strip 42 comprises a high contrast type, vesicular film exposed by light, developed by heat and cleared by light in the clearing station 48 associated with the exit port. The clearing station includes a clearing lamp 159 which directs a film clearing light radiation to each completed microfiche record as it reaches the exit port 22.

In accordance with the present invention, development of the exposed latent images within each successive image area on the master film strip 30 is carried out at the master film developing station 38 by the application of heat directly against the surface of the film for a preselected, adjustable period of time. Referring specifically to FIGS. 2 through 5, the master film strip 30 is advanced (arrow A—FIG. 3) along the master film processing path until an image area on the master film is centered between the support rolls 110 and 112, occupying a generally planar path comprising a first position in readiness for film development. Heat is applied directly to an exposed outer surface of the film at the developing station 38 by a developer shoe 70 supported on a pivot arm 76 mounted on a shaft 75. The shaft is driven to rotate or rock the arm 76 in opposite directions to move the developer shoe between a first position (FIG. 3) spaced remotely away from the segment of film stretched between the rollers 110 and 112 and a second film developing position (FIG. 2) wherein a convex, arcuately curved, heated under surface 70a of the shoe is brought into intimate contact against the exposed surface of the film and the exposed latent image area thereon. The shaft 75 is rocked back and forth around a pivot axis 78 spaced upwardly and parallel of the upper support roll 112 to alternately move the developer shoe as disclosed between remote and film developing positions.

In order to shield the film 30 from unwanted or spurious heat and in particular to shield the segment of master film extending between the spaced apart rolls 110 and 112 from radiant heat and/or heated air generated at the surface 70a of the developer shoe, while the shoe is spaced upwardly in the remote position (FIG. 3), a curved heat shield 72 is interposed between the surface 70a of the shoe and the upwardly facing, exposed surface of the master film. The heat shield 72 is formed with a layer of insulating material 72a on the upper face thereof and is generally curved to match the curved, convex surface 70a of the heated developer shoe 70.

The heat shield is supported from one end for pivotal movement about a pivot axis 74 spaced upwardly away from the lower support roller 110 and spaced outwardly of a free outer end portion of the developer shoe 70. An inner end portion of the heat shield 72 is connected to a spindle 73 by a bracket 77 and the heat shield is biased in a counter-clockwise direction towards a heat shielding position directly interposed between the developer shoe and the master film by means of a coil spring 79. The spring has convolutions mounted on spindle 73 and opposite end legs of the spring are keyed to the spindle and bracket 77, respectively, to effect the counter-clockwise bias.

Figure 2:
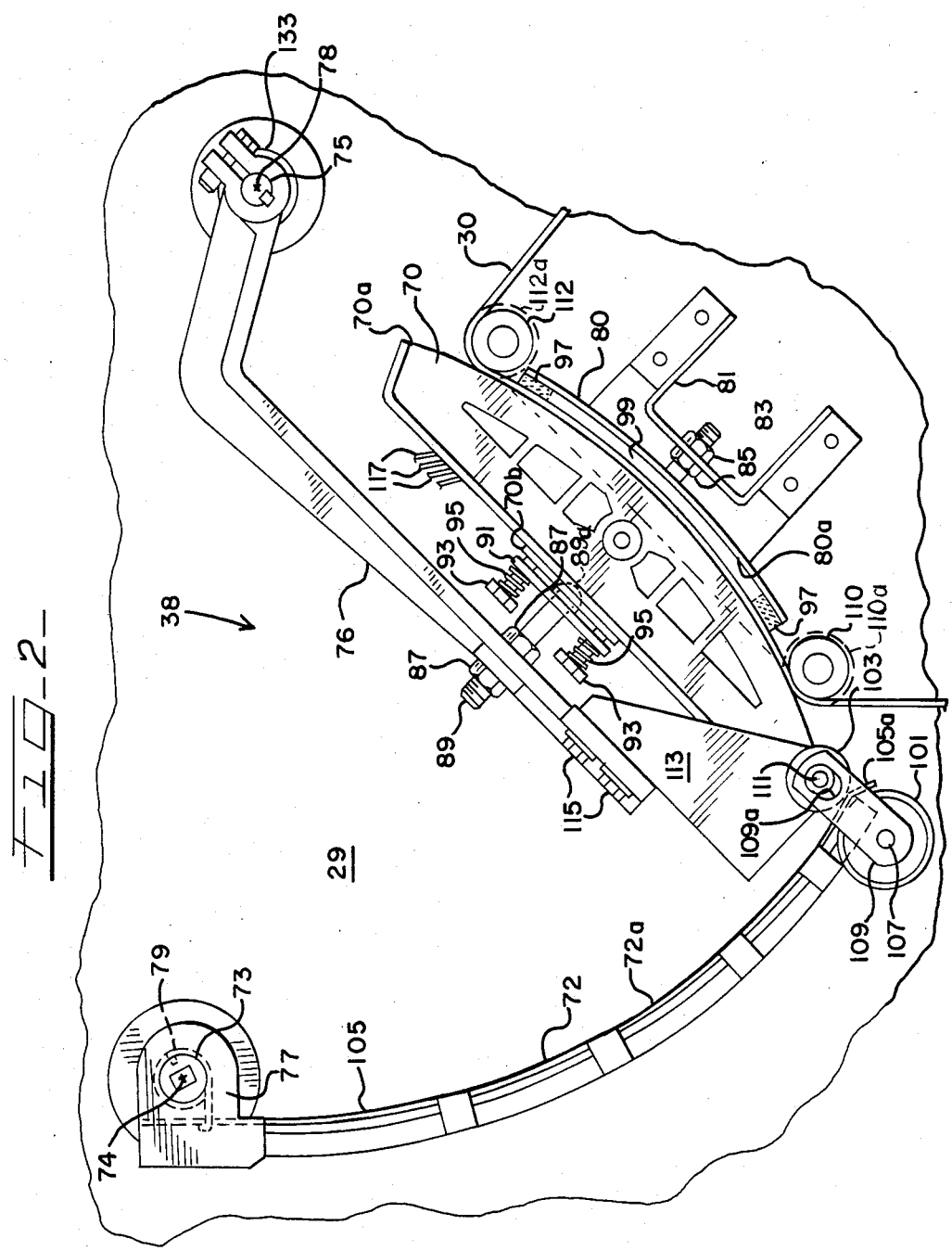
FIG. 2 is a side elevational view of a new and improved film development system constructed in accordance with the features of the present invention and illustrating a developer shoe in contact with the master film strip for developing latent images thereon by the application of heat.

In accordance with the present invention the developing station 38 also includes a curved, backup member 80 of concave shape adapted to face and cover the underside of the master film strip 30 when the film is deflected into a second path comprising a film developing position (FIG. 2) wherein the film is subjected to increased tension so as to conform tightly to the arcuately curved, convex heated surface 70a of the developer shoe 70. The backup member 80 is positioned between the support roller 110 and 112 and is mounted on a bracket 81 supported from the vertical chassis plate 29. Precise positioning of the backup member on the bracket is accomplished by means of a threaded stud 83 and lock nuts 85 so that a film facing, curved surface 80a of the backup member can be precisely aligned to match the heated surface 70a of the developer shoe 70 when the shoe is in the film developing position as shown in FIG. 2.

The developer shoe is supported on the arm 76 by a threaded stud 89 and lock nuts 87. The inner end of the stud 89 has a hemispherical ball 89a engaging a conical seat defined in a plate 70b on the back of the developer shoe 70. A mounting plate 91 is loosely received on the stud 89 in engagement with the hemispherical end 89a and is in general parallel alignment with the planar back face of the body of the developer shoe. The mounting plate 91 is provided with apertures adjacent the corners thereof in order to accommodate cap screws 93 which project through the apertures and into threaded engagement with the back plate 70b on the body of the developer shoe. A coil spring 95 is provided on each of the cap screws 93 between the head thereof and the mounting plate 91 in order to provide a pivotable interconnection between the stud 89 and the developer shoe 70 so as to provide for precise positioning and guidance of the developer shoe as the shoe is seated in intimate heating engagement with the master film strip 30 during the developing process. The ball joint connection between the stud 89 and developer shoe 70 working in conjunction with the spring loaded plate 91 and the back plate 70b allows gimballed freedom of movement at the time of development contact between the surface 70a of the shoe and the film strip 30, and further controls the attitude of the shoe in the remote or raised position.

The backup member 80 is provided with a peripheral heat seal around the edges comprising a pair of resilient heat sealing strips 97 extending transversely across the length of the master film strip 30 and a pair of longitudinally extending heat sealing strips 99 extending along opposite edges of the strip. These heat sealing strips tend to minimize convection heat transfer longitudinally along the master film strip in either direction beyond and outside of the image area. In addition, the backup member also diminishes convection air flow up along the inclined face of the film strip to insure uniform temperature distribution on the image area between the rollers 110 and 112 during the developing process, thus providing a uniformly developed image density. The heat sealing strips 97 and 99 are formed of heat insulating resilient material and help to conserve and concentrate the heat provided by the heated surface 70a of the developer shoe 70 so that heat is not lost and precise timing of the development cycle can result in a uniform development of the image area on the master film strip 30 that is positioned between the support rolls 110 and 112. As an alternative, the whole upper surface of the backup member 80 can be covered by a uniform thickness blanket 97a (FIG. 3) of heat insulating material rather than the edge strips 97 and 99.

It will be seen that the segment of the film strip 30 that is stretched between the rollers 110 and 112 (FIG. 3) is automatically subjected to increased tension as the developer shoe 70 moves into contact with the surface of the film strip and deflects or bends the film to conform closely to the shape of the curved, surface 70a. The film tension is also increased by the action of the dancer roll 108 between the second film clamp 102 and the support roll 110 when the latch 120 is unlocked. The bias spring 126 acts on the dancer roll arm 122 to provide an increased amount of tension on the film above the level normally provided by the drive motors 94 and 96 and this insures that the master film strip 30 will always be brought into tight conforming contact against the heated surface 70a of the developer shoe during a developing cycle.

Figure 3:
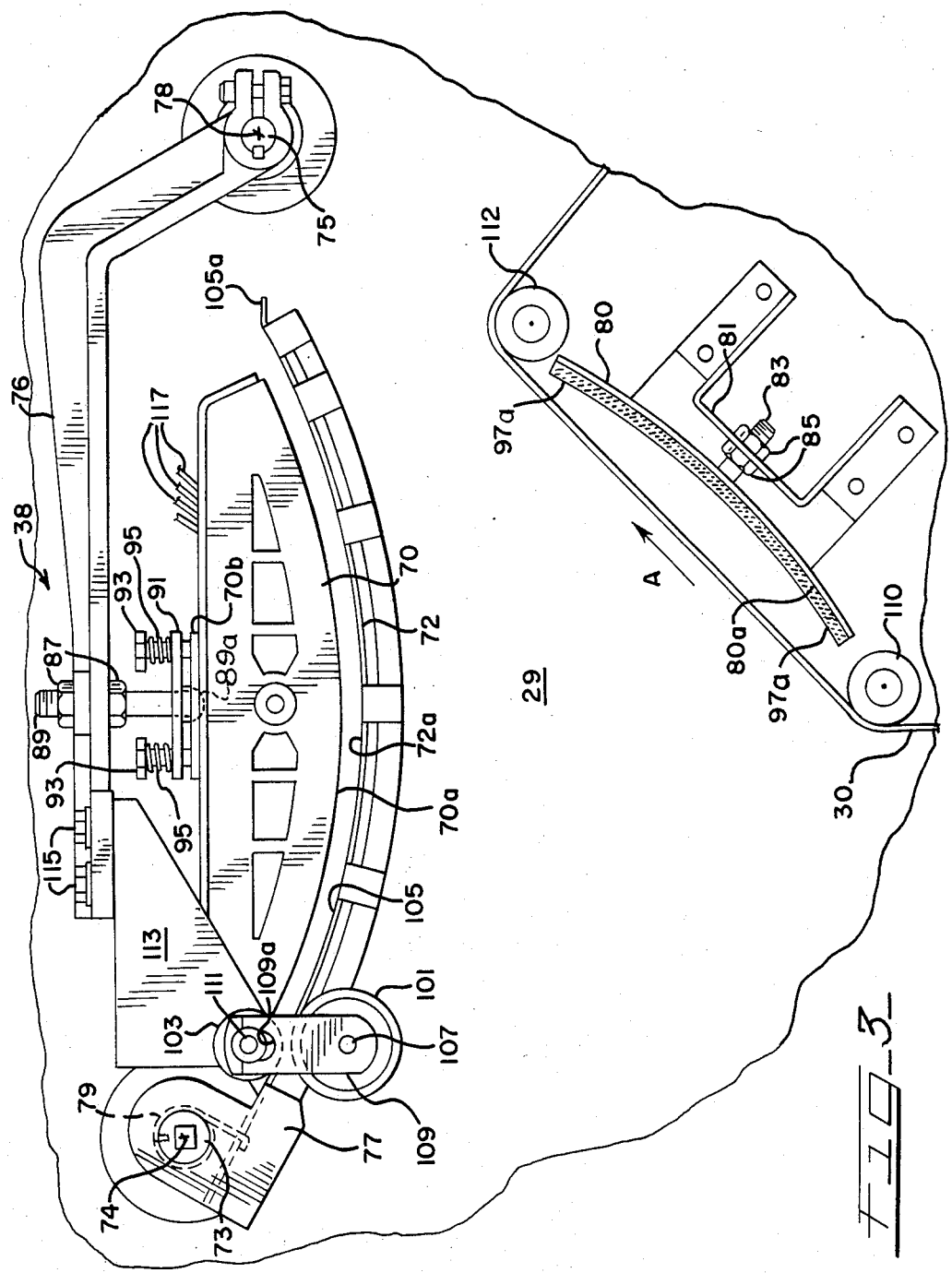
FIG. 3 is a front elevational view of the apparatus illustrating the developer shoe in a remote position away from the film path with a heat shield interposed between the shoe and the film for preventing inadvertent or uneven development of the images along the film strip.

As soon as a developing cycle is completed, the developer shoe pivot arm 76 is rotated in a clockwise direction from the developing position of FIG. 2 to the remote position of FIG. 3 which is generally horizontal and spaced well above the upper support roll 112. After a time delay period following the completion of heat development in order to allow the film strip to cool, the master film strip 30 is advanced in the direction of arrow A until a next successive image area is positioned on the film processing path between the rolls 110 and 112 in readiness for developing the exposed latent images thereon. As the developer shoe 70 moves toward the remote position, the heat shield 72 automatically pivots in a counterclockwise direction from the retracted position of FIG. 2 into the heat shielding position of FIG. 3 wherein the heated surface 70a is shielded from the fresh portion of the master film strip 30 moving into position between the rolls 110 and 112 ready for development.

A mechanical interconnection between the developer shoe 70 and the heat shield 72 is provided by a cam and follower system which comprises a pair of cam rollers 101 and 103 spaced on opposite sides of a cam track 105 of curved configuration formed on one longitudinal edge of the heat shield structure. The larger diameter cam follower roller 101 is designed to ride along the underside of the cam track 105 and encounters an end stop 105a at the outer end of the curved cam track when the heat shield is in the fully retracted position as shown in FIG. 2. The larger cam follower roller 101 is supported on an axle 107 mounted adjacent the free outer end portion of a link member 109 which is slidably and pivotally connected to a spindle 111. The spindle 111 also supports the small diameter cam follower 103 and is mounted to project outwardly from a bracket 113 secured to the outer end of the arm 76 with cap screws 115. The link 109 is formed with an elongated slot 109a to permit angular as well as longitudinal adjustment of the link on the spindle 111 as relative movement between the developer shoe 70 and the heat shield 72 takes place during a cycle of operation.

The mechanical interconnecting arrangement between the developer shoe and the heat shield results in a smooth and automatic operation wherein an initiating movement of the developer shoe from the remote position of FIG. 3 toward the film developing position of FIG. 2 automatically results in retraction of the heat shield 72 out of the heat shielding position of FIG. 3 to the fully retracted position of FIG. 2. After a heat developing cycle has been completed, movement of the developer shoe 70 from the heat developing position of FIG. 2 back toward the remote position of FIG. 3 automatically results in movement of the heat shield 72 from the retracted position of FIG. 2 back to the heat shielding position of FIG. 3. The stop element 105a at the free end of the curved cam track 105 on the heat shield coupled with the bias spring 97 insures that the developer shoe 70 and heat shield 72 move in the prescribed interrelationship and permits rapid movements to occur without danger of the mechanical interconnecting linkage between these components becoming uncoupled.

Precise, adjustable positioning of the backup member 80 and the resilient heat shielding strips 97 and 99 thereon coupled with the resilient mounting arrangement of the developer shoe on the arm 76 provides for smooth operation of the system with minimal danger of any tearing or damage to the master film strip 30 during the developing process. Moreover, the desired amount of contact pressure between the heated surface 70a of the developer shoe 70 and the facing surface of the master film strip 30 on the segment between the support rolls 110 and 112 may be accurately controlled and adjusted to achieve uniform film developing characteristics as successive image areas are developed during prolonged operation of the microimage recorder 20. Predevelopment, over-development or under-development of the film is greatly reduced and eliminated by the heat sealing strips 97 and 99 on the backup member 80.

The heated surface 70a of the developer shoe is maintained at a relatively constant, selectively adjustable, temperature range. The surface is electrically heated by electric current supplied through wires 117 and the amount of electrical power supplied is regulated closely to a value selected and responsive to a thermostatically controlled supply circuit. In addition, the time period that the heated shoe 70 is in contact with the film 30 is selectively adjustable and accurately controlled.

Figure 4:
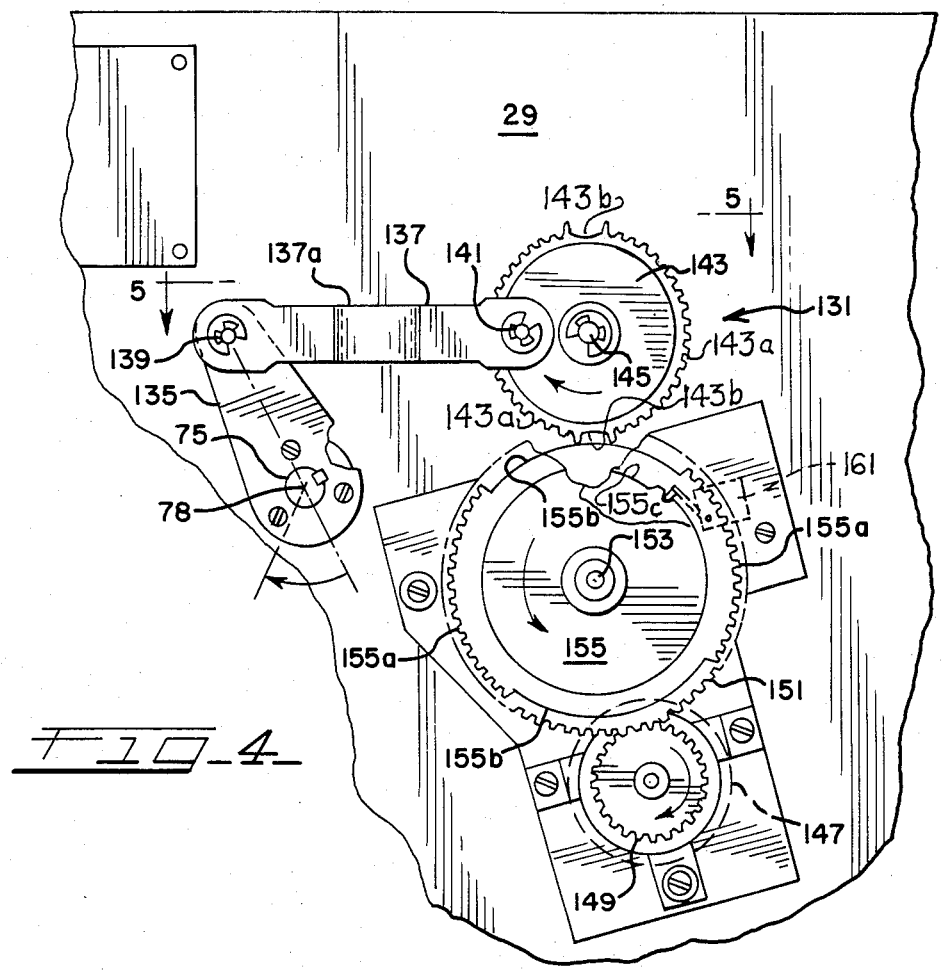
FIG. 4 is a rear elevational view of a drive system for alternately moving the developer shoe between a remote position and a developing position.
Figure 5:
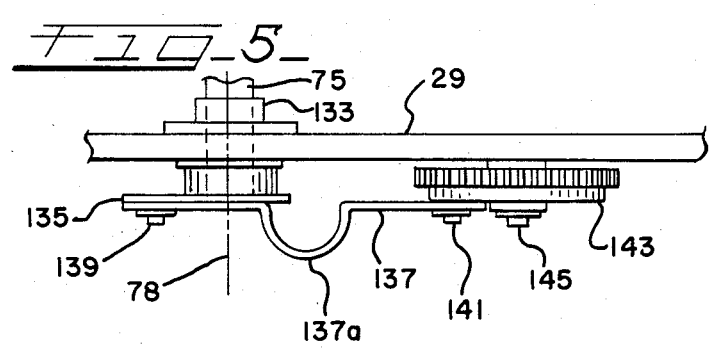
FIG. 5 is a fragmentary cross-sectional view taken substantially along line 5—5 of FIG. 4.

In accordance with the present invention, reciprocating pivotal or rocking movement of the shaft 75 controlling the position of the developer shoe 70 is achieved by a drive mechanism 131 illustrated in FIGS. 4 and 5. The shaft 75 is supported in a bearing 133 mounted on the face of the chassis plate 29 and projects through an opening therein beyond the rearward face of the chassis. A rocker arm 135 is keyed to rotate with the rearwardly projecting portion of the spindle 75 and an outer end of the arm is pivotally connected to a compliant link 137 by a pin 139. An opposite end of the compliant link 137 is connected to a crank pin 141 mounted eccentrically on a driven gear wheel 143 supported for rotation on a spindle 145 projecting rearwardly outwardly of the chassis 29. The gear wheel 143 is driven to rotate in successive part revolutions of 180° segments, interrupted alternately by dwell periods. This arrangement causes the rocker arm 135 to rotate intermittently back and forth between successive dwell positions wherein the crank pin 141 is positioned alternately at dead center on opposite sides of the support shaft 145.

The compliant link member includes a U-shaped central portion 137a which provides resilience in the link member itself so as to accommodate small differences in angular position of the rocker arm 135 when the eccentric crank pin 141 is in a dwell position in either of the eccentric dead center positions on opposite sides of the gear spindle 145. The gimballed mounting of the shoe 70 relative to the arm 76 insures close conforming contact between the heated surface 70a of the developer shoe and the master film strip 30 and the compliant link 137 accomodates a small amount of over-driving provided when moving the developer shoe 70 down to the developing position. Accurate positioning of the shoe is accomplished by contact of the curved surface of the shoe at adjacent opposite end portions against accurately machined end caps 110a and 112a (FIG. 2) provided on the rollers 110 and 112, respectively. The compliant link insures consistently repeatable, highly accurate positioning of the developer shoe 70 against the machined end caps 110a and 112a when heat developing the film strip 30 takes place without overstressing any of the drive linkage members that are drivingly interconnected to the arm 76.

The drive mechanism 131 is powered by a low voltage, uni-directional, DC motor 147, and this motor and the master film strip supply and takeup drive motors 94 and 96 are controlled by an electronic circuit and control system which is described in detail in copending U.S. patent application Ser. No. 893,750, filed Aug. 6, 1986, and incorporated herein by reference. The motor 147 includes an output shaft having a pinion 149 thereon in continuous driving engagement with a larger diameter, gear 151 mounted for rotation on a shaft 153 projecting outwardly of the chassis 29. The gear 151 is drivingly secured to a "Geneva" gear 155 also rotatably mounted on the shaft 153. The "Geneva" gear 155 includes a pair of toothed gear segments 155a in diametrically opposed relation for intermittent, driving engagement with the teeth on the crank driving gear 143. Between the toothed gear segments 155a, the "Geneva" gear 155 is formed with smooth, non-toothed segments 155b, so as to provide alternate dwell periods between successive driving engagements with the crank driving gear 143.

The gear 143 includes diametrically opposed gear segments 143a adapted to be driven by meshing engagement with the toothed segments 155a of the "Geneva" gear 155 to move the crankpin 141 between opposite dead center positions on opposite sides of the shaft 145. Between the toothed segments 143a, the gear 143 is provided with a pair of dwell or follower sections 143b adapted to engage the smooth surface or dwell segments 155b of the Geneva gear and prevent rotation of the gear 143 after each successive period of driving engagement between the toothed segments 155a and 143a is completed. This arrangement maintains the developer shoe 70 in fixed positions between alternate cycles of movement.

A position sensing switch 161 is provided to sense the position of the "Geneva" gear 155 by engagement with a cam surface 155c thereon in order to deenergize the drive motor 147 at the end of each period of driving engagement between a pair of toothed segments 155a and 143a. At this time when the dwell segments 143b and 155b are first engaged, some amount of coasting action in the motor and gear train takes place inherently even after power is shut off by the switch 161, but the gear 155 may continue to turn. However, when the dwell section 155b and dwell section 143b are engaged, turning movement of the gear 143 is prevented so that an accurate stop position of the gear 143 at alternate dead center crank positions is always achieved even though coasting action is inherent in the stopping of the motor 147 and the gears 149, 151 and 155.

The "Geneva" gear drive system as described provides an economical, highly accurate stop positioning system in spite of inherent inaccuracies in the stopping of gear 155. Although the DC motor 147 drives the respective pinion 149 and gears 151, 155 and 143 in a uni-directional manner, the drive mechanism 131 provides for reciprocal, precisely controlled reversing rotation or rocking action of the shaft 75 for moving the developer shoe 70 between the remote and film developing positions as previously described and illustrated in FIGS. 3 and 2, respectively.

Although the invention has been described in terms of a preferred embodiment, it will be obvious to those skilled in the art that many alterations and modifications may be made weithout departing from the invention. Accordingly, it is intended that all such alterations and modifications be considered as within the spirit and scope of the invention as defined by the appended claims.

We claim:

1. In a microimage recording apparatus of the type using an elongated film strip movable along a film path, said film strip of the type utilizing heat for developing latent image areas formed on said film strip at an exposure station, a developing station comprising:

means for supporting said film strip along said path at spaced apart support locations on opposite sides of a previously exposed latent image area thereon in position ready for developing;

means for tensioning said film strip at said support means;

developer shoe means having an outwardly convex heated surface adapted to contact a facing surface of said film strip between said support locations for developing said latent image area;

said developer shoe means mounted for movement between a remote position away from said film path and a film developing position wherein said film strip is tensioned in intimate conforming heated contact against said convex surface for a selected time period to develop said latent image area; and heat shield means movable between a heat shielding position interposed between said heated surface of said developer shoe means and said film strip and a retracted position when said developer shoe means moves into heated contact with said film strip at said support means.

2. The developing station of claim 1, including;

back-up means between said support locations adjacent an opposite surface of said film strip for retaining heat provided by said developer shoe means while in contact with said film strip.

3. The developing station of claim 1, wherein said film strip tensioning means includes;

drive means at opposite ends of said film strip for driving take up and supply reels to tension said film strip along said film path between said support locations of said support means.

4. The developing station of claim 3 wherein said film strip tensioning means further includes:

a plurality of film clamps along said film strip path engageable with said film strip on opposite sides of said support locations for holding said film strip under a selected value of tension between said support locations.

5. The developing station of claim 4 wherein said film strip tensioning means further includes;

dancer roll means engageable with said film on said film path for exerting tension on said film strip to a higher value above said selected value while said clamps are in clamped engagement with said film strip.

6. The developing station of claim 4 wherein: said film clamps are operative to maintain said selected value of tension while said drive means is inoperative.

7. The developing station of claim 1 wherein: said convex heated surface of said developer shoe means tends to increase tension on said film strip as said heated surface moves to engage said facing surface of said film strip when providing said intimate conforming heated contact for developing said latent image area.

8. The developing station of claim 5 wherein: said dancer rolls means is biased to maintain said increased tension on said film strip at a selected higher tension value as said developer shoe means moves to engage said film strip.

9. The developing station of claim 4 wherein: one of said film clamps is positioned between said exposure station and said supporting means along said film strip path.

10. The developing station of claim 2 wherein: said back-up means includes a concave wall facing an opposite surface of said film strip between said support locations; and
resilient heat sealing means around the periphery of said wall for engagement with said opposite surface of said film strip around said latent image area while said film strip is in intimate heated contact with said developer shoe means for development of said latent image area.

11. The developing station of claim 10 wherein: said concave wall is spaced apart from said film strip being developed by heated intimate contact against said convex surface of said developer shoe means.

12. The developing station of claim 11 wherein: said supporting means includes a guide roll at each support location and said wall of said back-up means extends between said guide rolls and includes a film strip facing surface spaced away from said film strip path defined directly between said guide rolls.

13. The developing station of claim 1 wherein: said developer shoe means is mounted for pivotal movement about an axis spaced from one of said support locations toward and away from said film strip path between said remote position and said film developing position; and
wherein said heat shield means is mounted for pivotal movement about an axis spaced from the other of said support locations and said pivot axis of said developer shoe between said heat shielding position and said retracted position.

14. The developing station of claim 13 including: linkage means interconnecting said developer shoe means and said heat shield means for movement of said heat shield means from said heat shielding position toward said retracted position in response to movement of said developer shoe means from said remote position toward said film developing position.

15. The developing station of claim 14 wherein said linkage means includes:
track means mounted on one of said developer shoe means and said heat shield means; and
cam follower means movable along said track means and mounted on the other of said developer shoe means and said heat shield means, said cam follower means movable between opposite ends of said track means in response to pivotal movement of said developer shoe means toward and away from said film path.

16. The developing station of claim 15 wherein: said track means is mounted on said heat shield means and said cam follower means is mounted on said developer shoe means spaced apart from said axis of pivotal movement thereof.

17. The developing station of claim 16 wherein: said cam follower means comprises a pair of cam rollers positioned to move along opposite edges of said track means to pivot said heat shield means from said heat shielding position toward said retracted position as said developer shoe means is pivoted from said remote position toward said film developing position.

18. The developing station of claim 17 including: biasing means normally biasing said heat shield means toward said heat shielding position.

19. The developing station of claim 1 including: drive means for pivoting said developer shoe means between said remote position and said film developing position.

20. The developing station of claim 19 wherein said drive means includes:
shaft means supporting said developer shoe means mounted for pivotal movement about said pivot axis in opposite directions between said remote position and said film developing position.

21. The developing station of claim 20 wherein said drive means includes:
arm means on shaft means for rotating the same in opposite directions; and
drive link means interconnecting said arm means and rotatable crank means.

22. The developing station of claim 21 wherein: said drive link means is resilient for permitting adjustment in the rotative position of said arm means when said developer shoe means is positioned in said film developing position.

23. The developing station of claim 21 wherein said drive means includes:
motor means for driving said crank means to rotate between first and second opposed positions on opposite sides of said rotary drive axis, said first and second positions corresponding to said remote position and said film developing position, respectively, of said developer shoe means.

24. The developing station of claim 23 wherein said motor means includes:
a uni-directional drive motor and gear means interconnected between said drive motor and said crank means.

25. The developing station of claim 24 wherein said gear means includes:
a pinion having alternate toothed and smooth arcuate segments for providing intermittent driving engagement with a gear for rotating said crank means between said first and second positions with a dwell period therebetween while said smooth segment rotates without driving engagement with said gear in order to accommodate continued rotation of said pinion after said crank means has stopped moving.

26. Apparatus for developing latent image areas on a film strip by the application of heat against one surface of said film strip comprising;
- means for supporting a length of said film between spaced apart supports on a first film path extending directly between said supports;
- means for tensioning said film between said supports;
- developer means including a heated surface engageable with said one surface of said film while tensioned along said first film path and movable to deflect and bend said film toward a convex curved second film path in intimate contact with said heated surface away from said first film path and
- heat shield means movable between a heat shielding position interposed between said heated surface of said developer means and said film on said first film path and a retracted position for permitting direct intimate heated contact between said heated surface of said developer means and said one surface of said film when said film is developed while positioned on said second film path.

27. The apparatus of claim 26 including:
- transport means for advancing successive portions of said film along said first film path for developing successive images formed thereon.

28. Apparatus for developing latent image areas on a film strip by the application of heat against one surface of said film strip comprising;
- means for supporting a length of said film between spaced apart supports on a first film path extending directly between said supports;
- means for tensioning said film between said supports;
- developer means including a heated surface engageable with said one surface of said film while tensioned along said first film path and movable to deflect and bend said film toward a convex curved second film path in intimate contact with said heated surface away from said first film path; and
- back-up means adjacent said second film path for engagement with an opposite surface of said film for retaining heat provided for developing said film by said developer means.

29. Apparatus for developing latent image areas on a film strip by the application of heat against one surface of said film strip comprising;
- means for supporting a length of said film between spaced apart supports on a first film path extending directly between said supports;
- means for tensioning said film between said supports;
- developer means including a heated surface engageable with said one surface of said film while tensioned along said first film path and movable to deflect and bend said film toward a convex curved second film path in intimate contact with said heated surface away from said first film path; and
- heat insulating means adjacent said supports for containing heat generated during the developing of said film on said second film path for retarding the flow of heat along said film toward portions of said film on opposite sides of said supports.

30. Apparatus for developing latent image areas on a film strip by the application of heat against one surface of said film strip comprising;
- means for supporting a length of said film between spaced apart supports on a first film path extending directly between said supports;
- means for increasing the tension on said film between said supports as said film is moved from said first film path toward a second film path for film developing;
- developer means including a heated surface engageable with said one surface of said film while tensioned along said first film path and movable to deflect and bend said film toward said second film path of convex curved shape into intimate contact with said heated surface away from said first film path;
- means for clamping said film at spaced apart locations thereon outside of said supports; and
- tension adjustment means engageable with said film between said spaced apart locations for increasing said tension on said film between said supports.

31. The apparatus of claim 30 wherein said tension adjustment means includes:
- roll means engaging said film between a support and an adjacent location biased to exert force against said film to increase tension thereon.

* * * * *

UNITED STATES PATENT AND TRADEMARK OFFICE
CERTIFICATE OF CORRECTION

PATENT NO. : 4,653,890

DATED : March 31, 1987

INVENTOR(S) : Eric W. Nordstrom, et al.

It is certified that error appears in the above-identified patent and that said Letters Patent are hereby corrected as shown below:

Column 10, line 13, delete "weithout" and substitute therefor --without--.

Column 11, line 17, delete "rolls" and substitute therefor --roll--.

Column 13, line 14, after "path" insert --;--.

Signed and Sealed this

Eleventh Day of August, 1987

Attest:

DONALD J. QUIGG

Attesting Officer

Commissioner of Patents and Trademarks